United States Patent

[11] 3,623,946

| [72] | Inventors | Robert R. Hobson;<br>Thomas E. Griffin, both of San Jose, Calif. |
|---|---|---|
| [21] | Appl. No. | 467,821 |
| [22] | Filed | June 22, 1965 |
| [45] | Patented | Nov. 30, 1971 |
| [73] | Assignee | The United States of America as represented by the United States Atomic Energy Commission |

[54] NUCLEAR REACTOR
9 Claims, 12 Drawing Figs.

[52] U.S. Cl. .................................................. 176/29,
176/33, 176/39, 176/40, 310/4
[51] Int. Cl. .................................................. G21c 7/00
[50] Field of Search .......................................... 176/27–29,
21, 39, 40, 33; 310/4

[56] References Cited
UNITED STATES PATENTS

| 2,993,850 | 7/1961 | Soodah et al. ................ | 176/21 |
| 3,089,840 | 5/1963 | Carter et al. .................. | 176/57 |
| 3,160,568 | 12/1964 | MacFarlane .................. | 176/29 |
| 3,230,146 | 1/1966 | Astley et al. .................. | 176/28 |
| 3,236,737 | 12/1964 | Frome et al. .................. | 176/28 |
| 3,243,613 | 3/1966 | Grover ......................... | 176/28 |
| 3,276,964 | 10/1966 | West et al. .................... | 176/20 |

FOREIGN PATENTS

| 621,190 | 5/1961 | Canada ....................... | 176/28 |

Primary Examiner—Carl D. Quarforth
Assistant Examiner—Harvey E. Behrend
Attorney—Roland A. Anderson ABSTRACT: A nuclear reactor comprising:
an elongated cylindrical core longitudinally divided into quadrants, each core quadrant being neutronically subcritical;
means for flexibly fastening together two diametrically opposed quadrants at one end of said core and for retaining the remaining two quadrants in a fixed position;
means for driving the free ends of said flexibly fastened quadrants apart and for returning them together;
means for controlling the reactivity of said reactor core; and,
means for removing the energy generated by said reactor core.

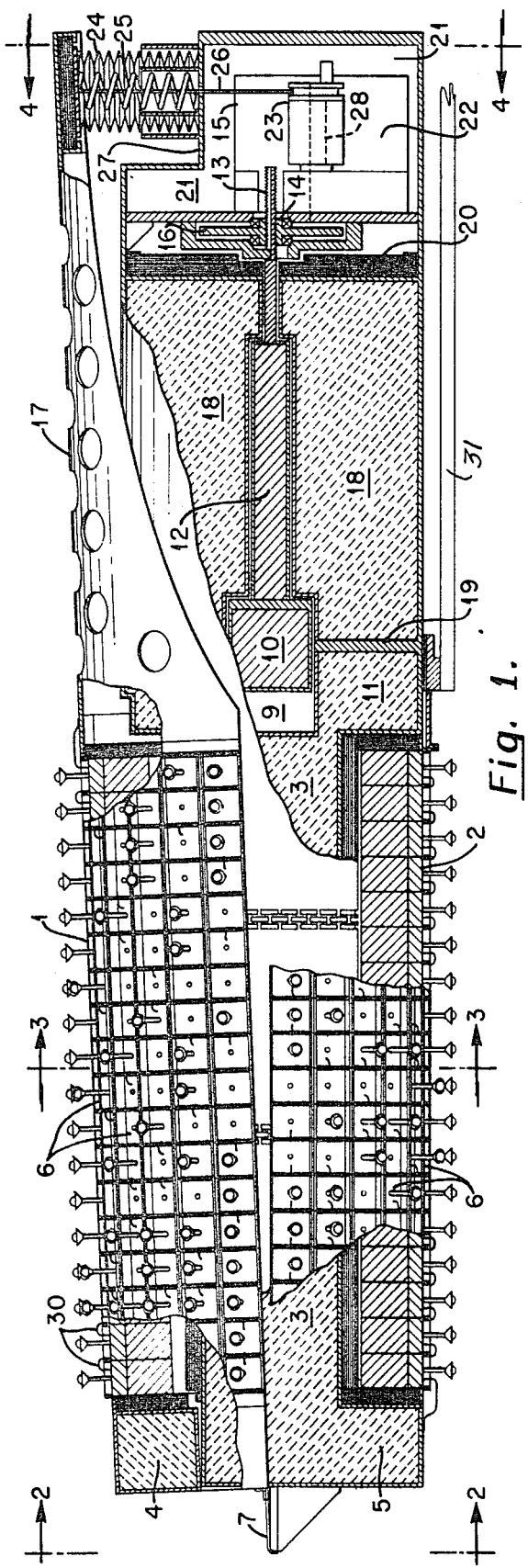
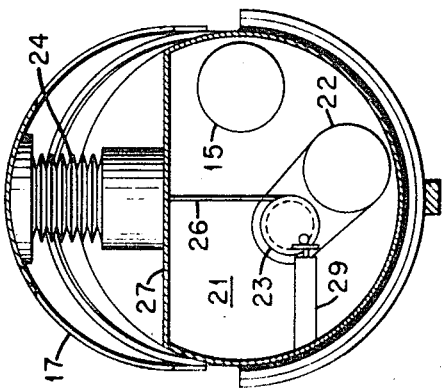
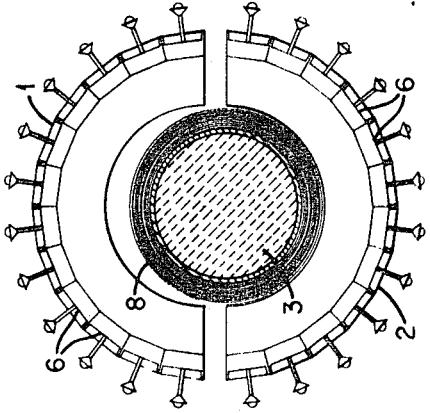
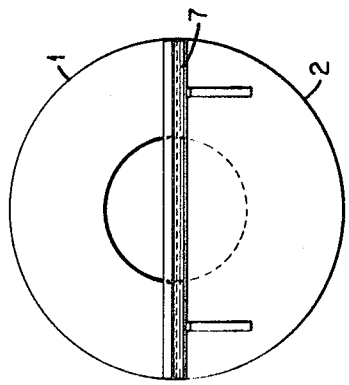
Fig. 1.
Fig. 2.
Fig. 3.
Fig. 4.
INVENTORS.
Robert R. Hobson
Thomas E. Griffin
ATTORNEY.

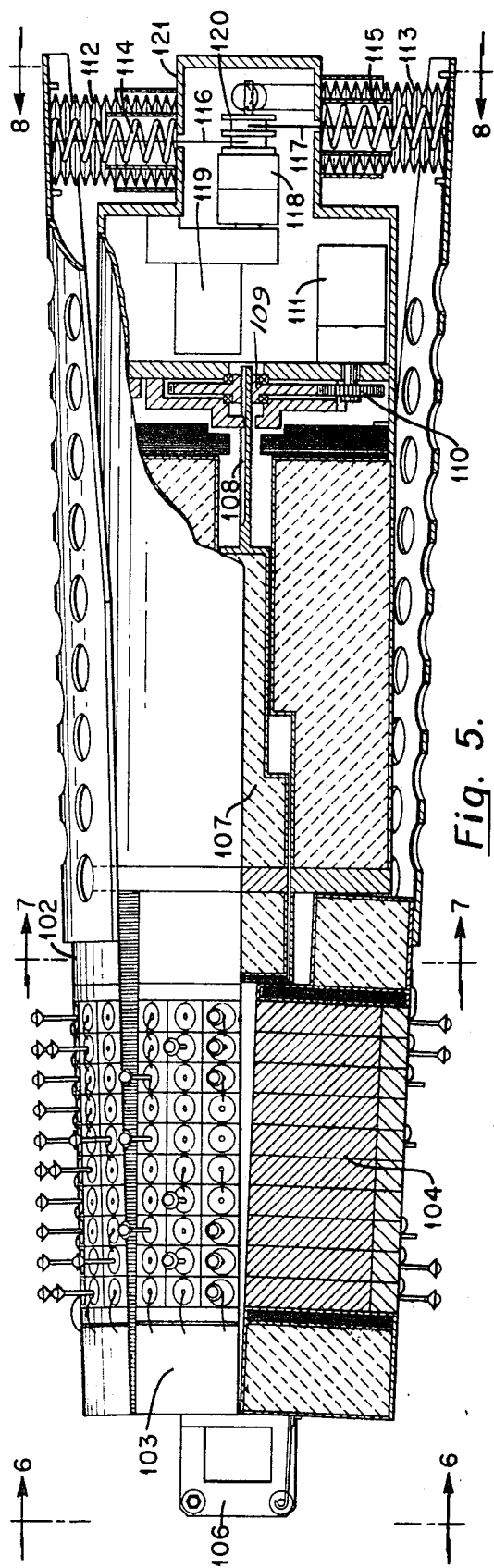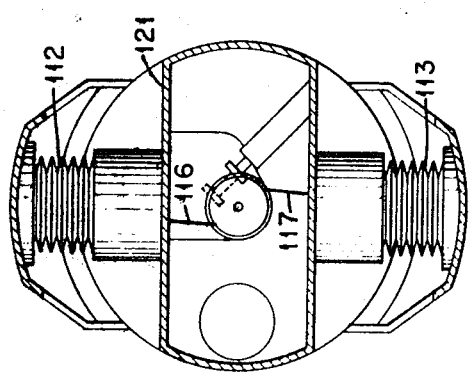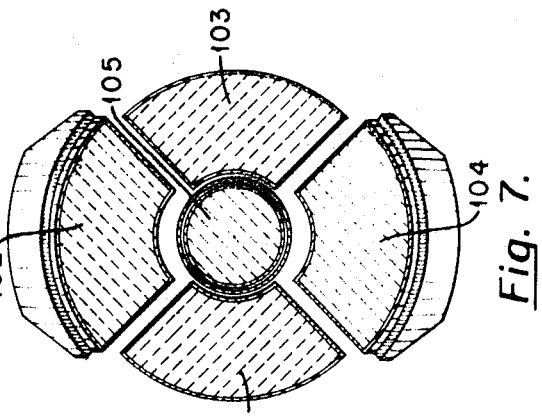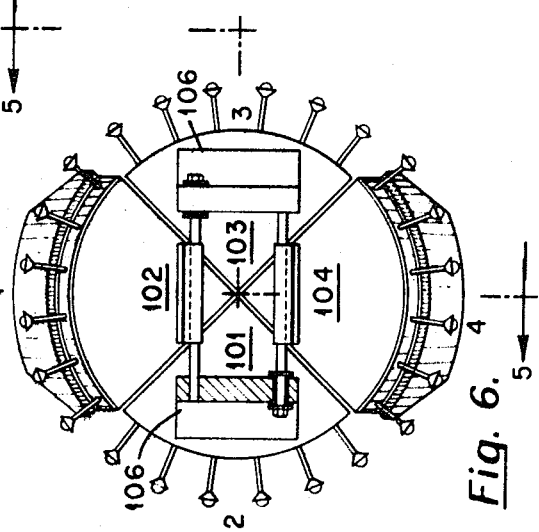
INVENTORS.
Robert R. Hobson
Thomas E. Griffin
ATTORNEY.

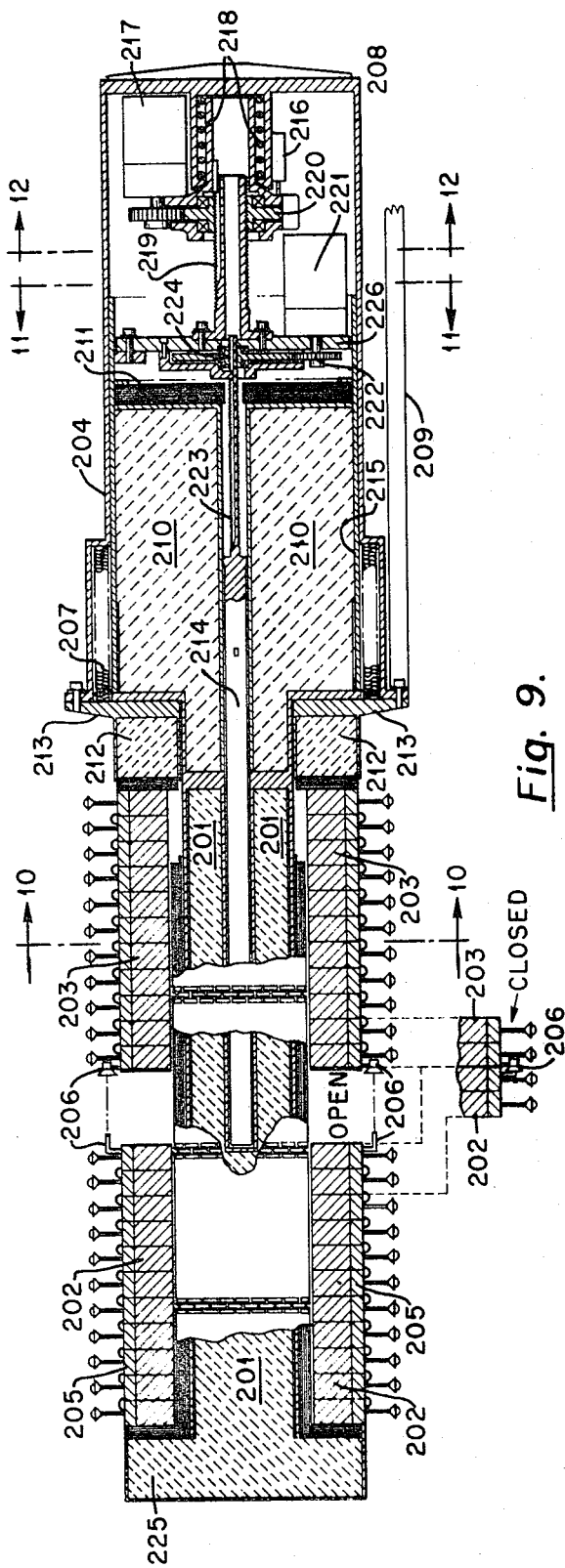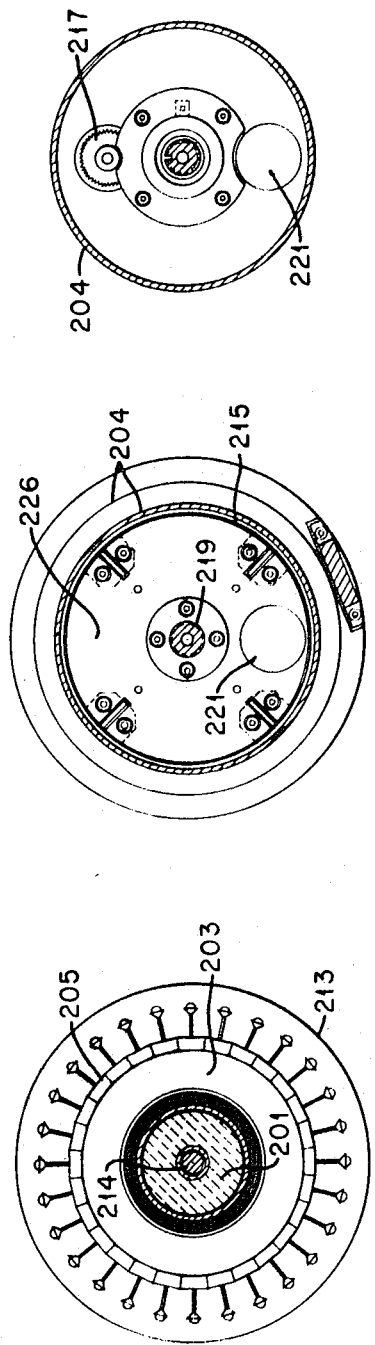

NUCLEAR REACTOR

This invention relates to nuclear reactors and in particular to nuclear reactors wherein compactness, reliability, and simplicity of control are of prime importance.

One of the major safety requirements for both rocket propulsion reactors and satellite auxiliary power reactors is that they remain subcritical until they are launched and are effectively out of the earth's atmosphere. This is to preclude any accident which might distribute fission products at lower atmospheric levels. To ensure subcriticality of such reactors, prior art methods have been concerned primarily with placing neutron absorbers in the reactor core during launching and removing them just prior to reactor startup. However, the insertion and removal of neutron absorbers necessitates having voids in the core to receive the absorber and having space external of the core for the absorbers. Therefore, it is one object of the subject invention to provide a reactor that can be kept safely subcritical without the use of neutron absorbers.

It is another object of the present invention to provide a nuclear reactor which can be reliably and safely operated in any geometrical attitude unaffected by gravitational fields.

Another object of the present invention is to provide a nuclear reactor which can operate in combination with a system for converting heat directly to electrical energy.

Another object of the present invention is to provide a reactor which does not require a complex startup procedure.

It is a further object of the present invention to provide a compact reactor system which has a relatively high power to weight ratio and long lifetime.

The invention comprises a compact, solid-fueled and fast reactor which can be mechanically separated into subcritical sections and reassembled into a power producing reactor. The separation can be effectively maintained during reactor launching. The simple motors and drives are sealed and shielded in a novel manner from heat and radiation to promote long and reliable operation. Working parts have been kept to a minimum.

The objects and advantages of the invention will appear more clearly from the following detailed description made principally with reference to the embodiments shown in the accompanying drawings in which:

FIG. 1 is a side view with a partial cutaway showing the reactor with thermionic converter cells attached thereto, and also showing the reactor control system;

FIG. 2 is an end view taken along line 2—2 of FIG. 1 showing the hinged end of the reactor core;

FIG. 3 is a view taken along line 3—3 of FIG. 1;

FIG. 4 is a view taken along line 4—4 of FIG. 1;

FIG. 5 is a side view with a partial cutaway showing another embodiment of the present invention;

FIG. 6 is a view taken along line 6—6 of FIG. 5;

FIG. 7 is a view taken along line 7—7 of FIG. 5;

FIG. 8 is a view taken along line 8—8 of FIG. 5;

FIG. 9 is a sectional view of still another embodiment of the present invention;

FIG. 10 is a view taken along line 10—10 of FIG. 9;

FIG. 11 is a view taken along line 11—11 of FIG. 9; and,

FIG. 12 is a view taken along line 12—12 of FIG. 9.

Referring now to FIG. 1, a reactor with an annular core is shown having a movable half 1 and a fixed half 2. Both of said halves surround a cylindrical central island reflector 3 which can be more clearly recognized by referring to FIG. 3. The core is of the solid homogeneous type preferably a matrix of uranium dioxide and tungsten which permits high temperatures and good heat conduction. The relatively thin annular shape of the core provides a short heat transfer path and the heat generation is concentrated near thermionic converter cells 6.

Again referring to FIG. 1, the central island reflector 3 serves a dual purpose of a neutron reflector and moderator since fast neutrons which leak from the core halves 1 and 2 will be slowed down in the island 3 and will return to the core halves degraded in energy and with a higher probability of causing a fission. The island 3 is composed of a material with good neutron slowing down properties and a low neutron absorption cross section. The preferred material is pyrolytic graphite which possesses the requisite neutron reaction characteristics plus the desirable heat transfer property of oriented heat conduction. Thus, the island will act as an insulator to radial heat conduction towards its center thereby keeping the maximum temperatures of the reactor assembly closer to the core periphery. Further insulation against inward radial heat transfer is provided by the annular heat shields 8. The result is to keep the emitters of a thermionic converter cells 6 at the high temperatures which are necessary for good converter efficiencies. The thermionic converter cells are further described in the related application Ser. No. 467,822 filed June 22, 1965, by Robert R. Hobson, one of the inventors herein. However, it is understood that the subject reactor is not limited to these particular converters as a number of thermionic converter devices are now well known in the art and could be suitably adapted to the subject invention.

Still referring to FIG. 1, movable core half 1 is rigidly attached to an annular end reflector 4. An extension 5 of island 3 provides a fixed end reflector for stationary core half 2. Flexure hinge 7 joins the two end reflectors and, in effect, serves as a pivot point so that movable core half 1 can swing away from fixed half 2. An end view of flexure hinge 7 can be seen in FIG. 2. Again referring to FIG. 1, island reflector 3 has a disk shaped end reflector 11 integrally attached to one end. There is a central cavity 9 in end reflector 11 to provide a control channel in which the shim control reflector 10 may move into and out of close proximity with the reactor core. Thus, the basic mode of control of the reactor is regulation of a neutron leakage from the core by changing the effectiveness of the neutron end reflector 11.

The shim control reflector 10 is connected to drive shaft 12 which in turn is connected to actuating screw 13. Driving nut 14 whose thread is connected to actuating screw 13 imparts linear motion to the drive shaft upon rotation. An electric shim drive motor 15 supplies the driving force to the driving nut 14 by means of a reduction gear 16. A typical material for the shim control is beryllium and for the end reflectors, carbon. Beryllium is a better neutron moderator and reflector than is carbon, and, therefore, its use enables the control of a greater amount of reactivity.

A closure extension arm 17 of semicircular shape extends longitudinally from movable core half 1 over and around the cylindrical shaped shadow shield 18, the gamma shield 19, and the end heat shield 20. Typical materials for these shields would be tungsten for the gamma shield 19, lithium hydride for the neutron or shadow shield 18, and tungsten and tantalum for the heat shield 20. These shields prevent damaging radiation and heat from reaching the drive motors and closure mechanisms in drive compartment 21. This compartment is sealed to permit the maintenance of a controlled environment around the drive mechanisms which allows the use of materials and lubricants that would not be possible otherwise in a space environment.

FIG. 4 is an end view showing compartment 21 and the arrangement of shim drive 15, closure drive 22, cable drum 23, and bellows seal 24 therein. FIG. 1 shows the opening and scram coil spring 25 disposed within bellows 24. The bellows and spring are connected between the closure extension arm 17 and the upper compartment wall 27 so that closing movable core half 1 against stationary core half 2 places spring 25 in compression. Cable 26 is attached to extension arm 17 and passes through coil spring 25 to cable drum 23 and can be wound thereon by the action of the closure drive motor 22. When cable 26 is wound on drum 23, the core halves 1 and 2 close and put the reactor in operating condition. A magnetic clutch 28 is in the drive chain between drum 23 and closure drive motor 22 so that upon a reactor scram signal the clutch is deenergized, the drum turns freely, and the core halves 1 and 2 will be forced apart by the expansion of spring 25. The open position of the core will also be maintained when it is desired that the reactor not be operable or that it be in such a condition that it might not easily go critical. Such a condition would occur when the reactor is installed in a satellite and launched into orbit by a rocket where it is highly desirable that the reactor not go critical until the satellite is in orbit.

Additional equipment for the above described embodiment is a scram buffer 29 or dash pot as shown in FIG. 4 to prevent excessive acceleration forces at the end of a scram stroke, the series connectors 30 shown in FIG. 1 which connect the thermionic converter cells 6 in series and the power output bus 31. The closure arm 17 serves as the other power output bus. The auxiliary parts of the reactor system such as limit switches, position indicators, and neutron level detectors can be included by the ordinarily skilled reactor designer.

The second embodiment of the subject invention is shown in FIGS. 5, 6, 7, and 8. FIG. 7 shows the four quadrants 101, 102, 103, and 104 which altogether comprise an annular core surrounding central cylindrical island reflector 105. A double flexure hinge 106 is shown in FIG. 6 which permits quadrants 101 and 103 to remain stationary while quadrants 102 and 104 are movable. A control scheme similar to that of the preferred embodiment described above is employed. The end reflector shim control piece 107 in combination with actuating screw 108, driving nut 109, reduction gears 110, and electric shim control drive motor 111 form the reactivity control system. The core closure is effected by cables 116 and 117 which are fastened to the opposite sides of drum 120 and to quadrants 102 and 104. The rotation of drum 120 will close quadrants 102 and 104. Upon deenergization of magnetic clutch 118, springs 114 and 115 will force the quadrants apart. Bellows seals 112 and 113 provide a seal between quadrants 102 and 104 and the drive motors compartment 121. Electric closure drive motor 119 supplies the force for driving drum 120. The separation between the movable quadrants 102 and 104 and the reflector island 105 for reactor launch is approximately one-half inch.

A third embodiment is illustrated in FIGS. 9, 10, 11, and 12. Referring first to FIG. 9, cylindrical central island reflector 201 is attached to annular movable core half 202 and the lip portion of the island reflector forms the end reflector 225 for the movable core half 202. Island reflector 201 extends through the central cavity of stationary annular core half 203 in a clearance fit therewith. Stationary core half 203 is fastened to annular end reflector 212, which in turn is attached to annular gamma shield 213. Drive mechanism housing 204 is bolted to gamma shield 213. Disposed within drive mechanism housing 204 is cylindrical neutron shadow shield 210 which is clad by cylindrical housing 215. Housing 215 is rigidly attached at one end to the island reflector 201. At the other end of housing 215 is a disk-shaped heat shield 211 which is disposed between circular mounting plate 226 and shadow shield 210. Mounting plate 226 is rigidly attached to the interior wall of housing 215 and carries shim drive motor 221, shim reduction gearing 222, shim driving nut 224, and shim screw 223. The shim control reflector 214 is disposed in a continuous circular passageway which extends through shadow shield 210 into island reflector 201. Also bolted to the center of plate 226 is hollow closure screw 219. The entire combination of island reflector 201, movable core half 202, shadow shield 210, mounting plate 226, and housing 215 is slideably movable as a rigid unit with the closure drive mechanism housing 204. A bellows seal 207 extends around and is sealed to housing 215 at one end, and at the other end is sealed to closure mechanism housing 204, thus providing a sealed compartment to house the enclosure drive and control mechanism. FIG. 11, a sectional view through the sealed compartment, shows the arrangement of shim drive motor 221 and closure screw 219 on mounting plate 226, and the placement of mounting plate 226 within housing 204.

Referring again to FIG. 9, closure drive motor 217 is mounted to the circular material wall of housing 204. The drive motor turns closure driving nut 220 whose threads engage closure screw 219 and impart linear motion thereto. This action will pull movable core half 202 towards stationary core half 203 and bring into contact electrical connectors 206, thus connecting the thermionic converter cells 205 which surround the movable core half to those of stationary core half 203. Also, as the core halves close, preloaded thermal expansion spring 218 is compressed. When the reactor is fully closed and the spring compressed, limit switch 216 prevents further travel of the closure screw 219. The compressed spring will keep the core closed even though relative thermal expansion takes place between the core and the island. The normal separation of the two core halves for a rocket launch of the reactor is 4½ inches.

While the invention has been described specifically with reference to particular embodiments thereof, it will be understood that numerous other embodiments are possible and various exchanges of modifications may be made, all within the full and inventive scope of the claims which follow.

What is claimed is:

1. A nuclear reactor comprising:
   an elongated cylindrical core longitudinally divided into quadrants, each core quadrant being neutronically subcritical;
   means for flexibly fastening together two diametrically opposed quadrants at one end of said core and for retaining the remaining two quadrants in a fixed position;
   means for driving the free ends of said flexibly fastened quadrants apart and for returning them together;
   means for controlling the reactivity of said reactor core; and,
   means for removing the energy generated by said reactor core.

2. A nuclear reactor comprising:
   an elongated, cylindrical, central neutron reflector;
   an elongated first core extending semicircularly around one half of said central reflector and a second elongated core extending semicircularly about the other half of said central reflector, each core half being neutronically subcritical;
   a semicircular disk-shaped end-reflector rigidly fastened to one end of said first core;
   a cylindrical end reflector fastened to one end of said second core and a second semicircular disk-shaped end-reflector rigidly fastened to the other end;
   a closure extension arm attached to the free end of said first core;
   means for flexibly fastening together said semicircular disk end-reflectors whereby the free end of said first core is able to open and swing away from said second core;
   means for opening and closing the free end of said first core away from and towards said second core;
   control means for regulating the reactivity of said reactor core; and, thermionic means disposed about the lateral surface of said core for producing an E.M.F.

3. The nuclear reactor of claim 2 wherein:
   the drive mechanism for opening and closing said divided core is, in combination, a sealed drive compartment, a bellows seal attached between said compartment and said closure extension arm, a coil spring disposed within a bellows seal, a cable extending through said spring and fastened to said closure extension arm, a drum upon which said cable is wound, an electric motor for driving said drum, and a magnetic clutch between said drum and said motor for scramming the reactor.

4. The nuclear reactor of claim 3 wherein:
   the control means is, in combination, a central movable portion of said cylindrical end reflector, a shaft attached to said movable portion, an actuation screw fastened to said shaft, a driving nut engaging said screw, reduction gears for transmitting rotary motion to said screw, and an electric motor for driving said gears.

5. The nuclear reactor of claim 4 wherein:
   the central cylindrical reflector consists of pyrolytic graphite clad with tungsten; and,
   the disk end-reflectors are composed of carbon.

6. The nuclear reactor of claim 5 wherein:
the movable portion of said cylindrical end-reflector is beryllium and the stationary portion is carbon.

7. The nuclear reactor of claim 6 wherein:
said first and second cores are a fuel matrix consisting of uranium dioxide and tungsten clad with tungsten.

8. A nuclear reactor comprising:
an elongated cylindrical central reflector;
a first annular core surrounding one half of said central reflector and a second annular core surrounding the other half of said central reflector, each of said cores being neutronically subcritical when separated from the other core;
a disk-shaped end-reflector fastened to said first core and integrally mounted on said central reflector;
an annular end-reflector fastened to said second core whereby said central reflector may slidably move through said annulus;
drive means mounted on said second core for moving said central reflector and first core away from and towards said second core;
means for controlling the reactivity of said first and second cores;
thermionic means disposed about the lateral peripheries of said first and second cores for producing and E.M.F.; and
means for electrically connecting said thermionic means of said first and second cores when said cores are driven together.

9. The nuclear reactor of claim 8 wherein:
the drive means is, in combination, a lead screw fastened to said central reflector, a driving nut engaging said screw, an electric motor with reduction gearing for driving said nut, a limit switch for stopping said motor, and a preloaded thermal expansion spring for holding said first and second cores together.

* * * * *